(12) United States Patent
Sturgin et al.

(10) Patent No.: US 6,494,519 B2  
(45) Date of Patent: Dec. 17, 2002

(54) VEHICLE COURIER DOOR SYSTEM AND METHOD OF CONVERSION

(75) Inventors: Todd Sturgin, Wadsworth, OH (US); Mark P. Gordon, Wooster, OH (US)

(73) Assignee: L&P Management Co., South Gate, CA (US)

(*) Notice: Subject to any disclaimer, the term of this patent is extended or adjusted under 35 U.S.C. 154(b) by 0 days.

(21) Appl. No.: 09/834,099

(22) Filed: Apr. 12, 2001

(65) Prior Publication Data

US 2002/0000735 A1 Jan. 3, 2002

Related U.S. Application Data

(60) Provisional application No. 60/197,204, filed on Apr. 14, 2000.

(51) Int. Cl.[7] .................................................. B60J 5/14
(52) U.S. Cl. .................... 296/50; 296/146.8; 296/146.9; 49/197
(58) Field of Search ..................... 296/50, 147, 146.8, 296/146.9, 155; 160/201, 40; 49/197

(56) References Cited

U.S. PATENT DOCUMENTS

| | | | | |
|---|---|---|---|---|
| 2,258,971 A | * | 10/1941 | Carlson | 160/37 X |
| 2,330,670 A | * | 9/1943 | Black | 160/201 X |
| 3,104,910 A | * | 9/1963 | Kappen | 160/201 |
| 3,424,222 A | * | 1/1969 | Stoner et al. | 160/201 |
| 4,511,173 A | * | 4/1985 | Wentzel | 160/201 |
| 4,793,397 A | * | 12/1988 | Whiteman | 160/201 |
| 5,501,503 A | * | 3/1996 | Thayer | 160/201 |
| 5,921,611 A | * | 7/1999 | Townsend | 296/146.8 |
| 6,085,825 A | * | 7/2000 | Swink et al. | 160/201 X |
| 6,098,696 A | * | 8/2000 | Styra | 160/201 |
| 6,257,651 B1 | * | 7/2001 | Morbach et al. | 296/147 X |

FOREIGN PATENT DOCUMENTS

| | | | | |
|---|---|---|---|---|
| DE | 1530897 | * | 7/1969 | 160/201 |
| JP | 5178093 A | * | 7/1993 | 296/146.8 |
| NL | 6804014 | * | 3/1969 | 296/50 |

* cited by examiner

Primary Examiner—D. Glenn Dayoan  
Assistant Examiner—Patricia L. Engle  
(74) Attorney, Agent, or Firm—Scott M. Oldham; Hahn Loeser +Parks

(57) ABSTRACT

The invention is directed to a retractable door assembly in a panel van type of vehicle comprising a cargo area having at least one door opening for access thereto. The retractable door assembly is positioned in at least one door opening, with the retractable door assembly comprising a flexible door member slideable between open and closed positions within opposing track assemblies. Access to the cargo area is provided by selectively sliding the flexible door to the open position. The vehicle conversion system comprises a retractable door assembly of predetermined dimensions, and a frame assembly selectively secured in a door opening of a vehicle. The retractable door assembly is mounted to the frame assembly to substantially close the door opening. A method of vehicle conversion is also set forth, comprising the steps of providing a door opening in a vehicle, and securing a frame assembly in association with the door opening. A retractable door assembly is mounted to the frame assembly, wherein the retractable door assembly is selectively slideable between open and closed positions.

35 Claims, 4 Drawing Sheets

VEHICLE COURIER DOOR SYSTEM AND METHOD OF CONVERSION

This application claims the benefit of 60/197,204, filed Apr. 14, 2000.

BACKGROUND OF THE INVENTION

The use of passenger vans as well as mini van type of vehicles for use in courier operations or the transportation and delivery of other goods or services has become more and more prevalent for many applications. Although certain types of vehicles have been developed specifically for such a purpose, such as step vans which have a large walk in area behind a drivers cab section. These specially designed vehicles are particularly suitable for transportation and delivery of packages or the like, and have been constructed to include retractable doors rather than hinged, swing-out door assemblies. Step vans of this type have been found to be advantageous in that the vehicle can back-flush to a loading dock or the like for loading and/or unloading of the vehicle. Although this is advantageous for certain applications, such vehicles are large, expensive to purchase and costly to operate.

For many applications, such as courier operations where a relatively smaller number of packages or the like are transported and delivered, a step van type of vehicle is simply not needed. To reduce costs associated with purchase or lease of vehicles for use in such applications, and to reduce operating costs, many businesses have therefore begun to use panel van size vehicles. Although these smaller vans provide the benefits of reduced capitol cost and operating costs, such panel vans are only produced by vehicle manufacturers to include hinged swing-out doors. Due to their construction, such vehicles do not allow backing flush to a loading dock, and simply do not provide convenient access to the rear cargo carrying area of the vehicle for use in courier or other similar types of operations. Panel van type of vehicles are also being used to a greater extent for a variety of other applications, such as work vehicles in which tools, equipment or other supplies may be stored in the cargo carrying area. For such applications, security as well as access to the cargo area are important factors. It would also be advantageous for such applications to allow easier access and increased security of such vehicles.

SUMMARY OF THE INVENTION

It is therefore an object of the invention to provide a courier door system for panel van size vehicles and conversion methods therefore which overcome the limitations associated with use of such vehicles for transport and delivery of packages or other commercial operations.

The invention is directed to a panel van vehicle comprising a cargo area having at least one door opening for access thereto. A retractable door assembly is provided in the at least one door opening, with the retractable door assembly comprising a flexible door member slideable between open and closed positions within opposing track assemblies. Access to the cargo area is provided by selectively sliding the flexible door to the open position. Additionally, the invention is directed to a vehicle conversion system comprising a retractable door assembly of predetermined dimensions, and a frame assembly selectively secured in a door opening of a vehicle. The retractable door assembly is mounted to the frame assembly to substantially close the door opening. A method of vehicle conversion is also set forth, comprising the steps of providing a door opening in a vehicle, and securing a frame assembly in association with the door opening. A retractable door assembly is mounted to the frame assembly, wherein the retractable door assembly is selectively slideable between open and closed positions.

These and other aspects of the invention will become apparent upon a further reading of the detailed description of the invention in conjunction with the drawings.

DETAILED DESCRIPTION OF THE INVENTION

Figure 1:
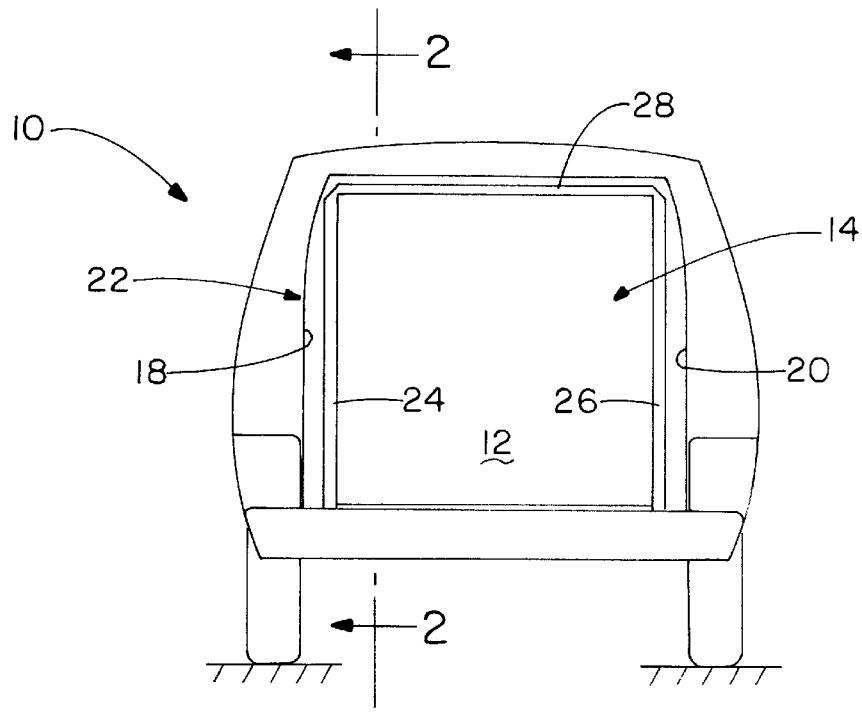
FIG. 1 is a rear view of a panel van showing a door conversion according to an embodiment of the invention.
Figure 2:
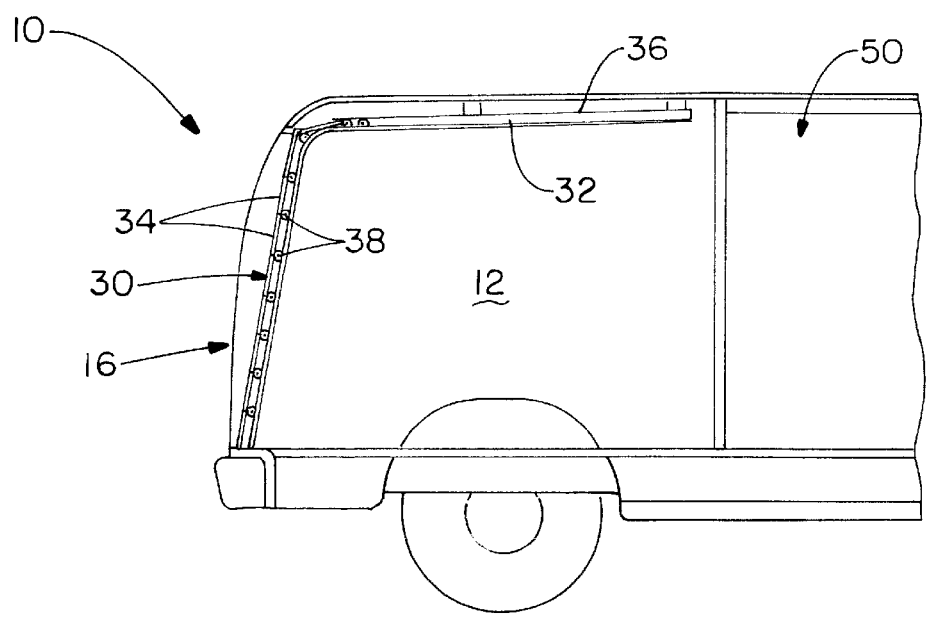
FIG. 2 is a partial side sectional view as may be taken along line 2—2 of FIG. 1.
Figure 3:
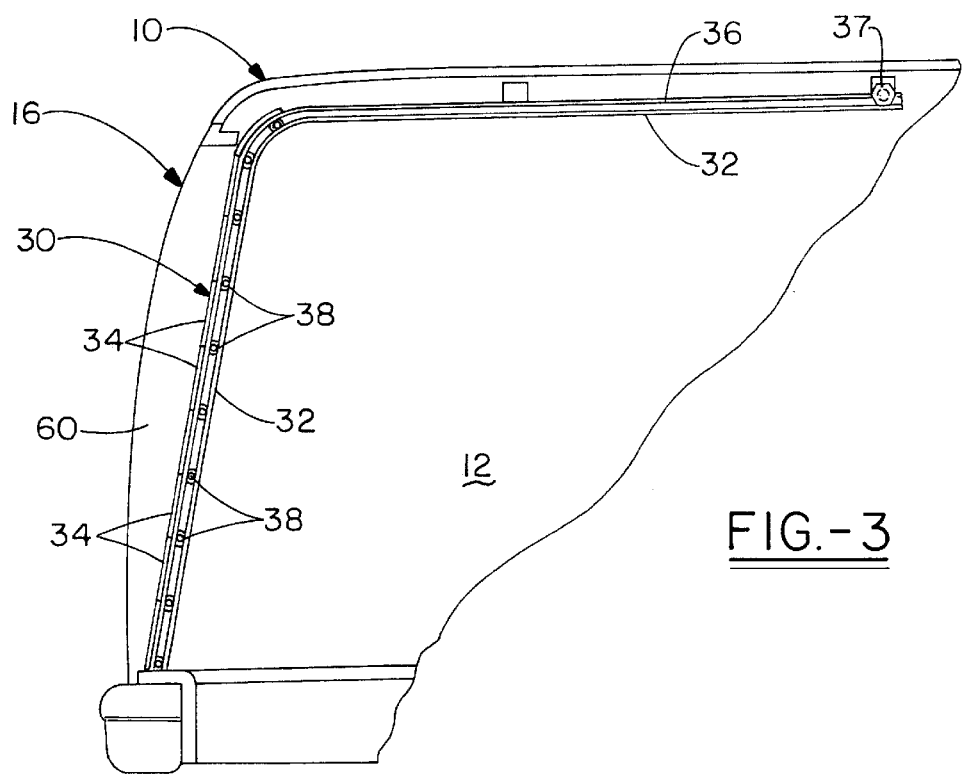
FIG. 3 is an enlarged partial side sectional view similar to FIG. 2.

Turning now to FIGS. 1–3, there is shown a panel van type of vehicle 10, which generally includes a rear cargo area 12. Panel vans of this type are manufactured by manufacturers, and are not custom made as is the case with step vans or the like. The panel vans generally have a gross vehicle weight (GVW) of less than 10,000 pounds. Such vehicles are typically transported by the OEM manufacturer using common freight carriers, such as the auto haulers or vehicle carrying railcars. Such vehicles include the Ford Econoline vans, Chevrolet vans, GMC Savanna vans, Dodge B Series Ram vans, Gm M Series vans, including the Chevy Astro and GMC Safari vehicles, or other similar types of vehicles. In retrofitting these types of vehicles, it is also possible to utilize a ship through system for converting the OEM vehicle to include the present invention, wherein upon ordering a vehicle, a buyer can divert the vehicle for conversion automatically. After conversion, the vehicle may be placed directly back into the OEM transportation system for delivery to the buyer. The panel van 10 is further generally sized such that the cargo carrying capacity of cargo area 12 has a height which is generally less than a typical adult user, being distinct from step vans. Additionally, step vans or the like are custom made, have significantly higher GVW, and are therefore not susceptible to transportation through the normal OEM transportation systems. These custom made step vans also cannot be handled via a ship through system as described above.

The vehicle 10 includes at least one door opening 14 for access to the cargo area 12, and as shown in FIG. 1, a rear door opening 14 is typical. The rear door opening 14 is typically provided with a pair of hinged doors (not shown) by the OEM manufacturer. These doors swing outwardly from the middle of opening 14 for access to cargo area 12. As such typical doors must be swung outwardly for access to cargo area 12, predetermined clearances relative to exterior structures must be maintained for access to cargo area 12. In this manner, such a vehicle cannot be backed into a flush position relative to a loading dock or other structure, while still providing access to cargo area 12. The present invention is therefore directed at providing a retractable door assembly in association with the door opening 14 to allow access to cargo area 12 without requiring any clearance relative to an exterior structure. Thus, using the retractable door assembly according to the invention allows the user to back into flush relationship with loading docks or other external structures. In the embodiment as shown in FIGS. 1–3, a retractable door assembly 16 is provided and dimensioned to substantially close the door opening 14 when door assembly 16 is shut A panel van vehicle according to the invention may therefore be manufactured OEM by providing suitable supporting structure about at least the first and second sides 18 and 20 of the door opening 14 for mounting the retractable door assembly 16 in association therewith. In the embodiment shown in FIGS. 1–3, a typical panel van 10 is converted to include the retractable door assembly 16. In such a conversion system, the swing-out doors provided in an OEM vehicle are removed and replaced by the retractable door assembly 16. Alternatively, an OEM manufacturer may be requested to provide vehicle 10 simply without any doors enclosing door opening 14, to allow retrofitting or conversion to use of the retractable door assembly 16. In the description to follow, the invention will be described with reference to a vehicle conversion system and method of vehicle conversion, but again it should be understood that the retractable door assembly 16 could be part of an originally manufactured panel van 10 providing distinct advantages in non-custom vehicles in a predetermined class of vehicles.

To convert van 10 to use a retractable door assembly 16, this embodiment of the invention provides a frame assembly generally indicated at 22, which may comprise first and second side frame members 24 and 26, and a top frame member 28. Dependent on the characteristics of the vehicle 10, the size and configuration of the frame assembly 22 may be adapted to be mounted in the door opening 14. Although shown as independent frame members which are selectively coupled together to form the frame assembly 22, the frame assembly 22 may comprise a one-piece assembly fabricated for a particular type of vehicle 10. The frame assembly 22 will provide the mounting structure for the retractable door assembly 16. The frame assembly 22 may be secured within the door opening 14 by any suitable method, such as bolting or welding directly to the vehicle in the vicinity of or adjacent opening 14.

Figure 4:
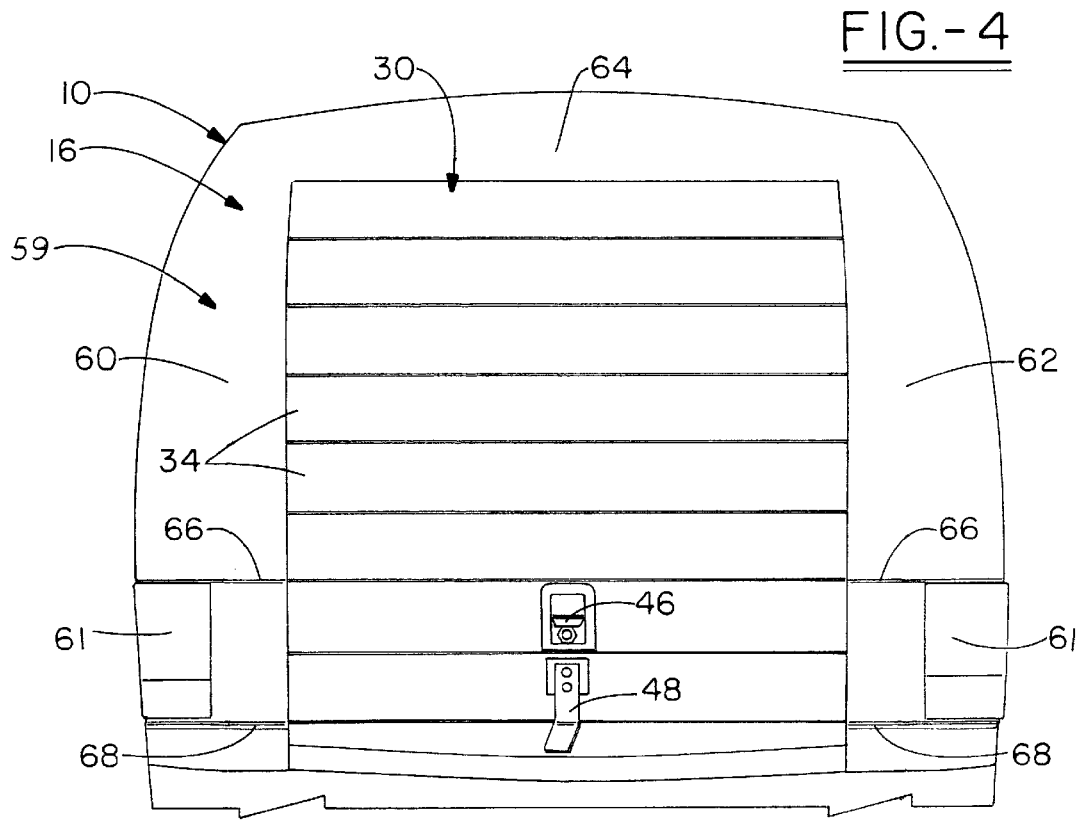
FIG. 4 is a rear view of a panel van modified according to the invention showing a door in the closed position.
Figure 7:
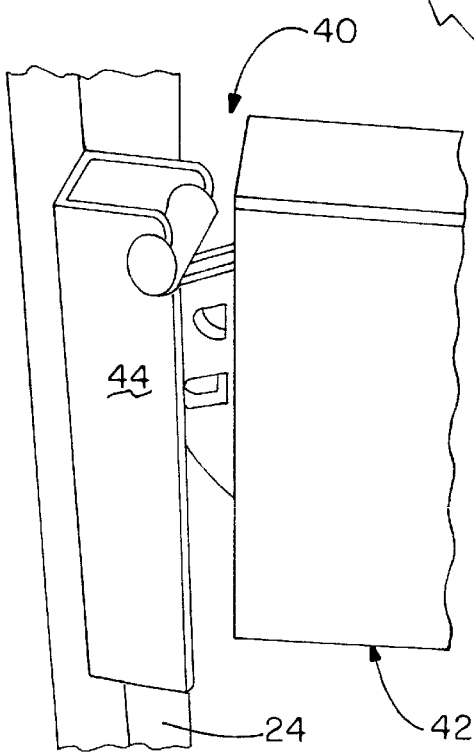
FIG. 7 is a perspective view showing a locking system as may be used in the invention.

The retractable door assembly 16 in general comprises a flexible door 30, which is slideably mounted in spaced apart, opposing tracks 32, which are mounted in conjunction with first and second side frame members 24 and 26. The tracks 32 extend from the bottom of the door opening 14 to a position adjacent the top of opening 14, and thereafter curve inwardly toward the interior of the vehicle as more particularly shown in FIGS. 2 and 3. The door 30 may be comprised of a plurality of individual panel sections 34 which are pivotally engaged with adjacent of the panels 34, such that door 30 is slideable from the closed position as shown in FIG. 3 to an open position, with door 30 sliding in the curved tracks 32 to a storage position in the top portion of tracks 32 as shown at 36. The flexibility of the door 30 allows it to follow the curved tracks 32 as it is slid upwardly to the storage position. The door 30 may include a plurality of rollers 38 on opposing sides thereof, which engage tracks 32, and allow slideable movement between closed and open positions. In the preferred embodiment, the retractable door assembly 16 includes a spring assist 37 as shown in FIG. 3, designed to facilitate movement of the door 30 from the closed position to the open position. The door 30 may also include a locking assembly 40 an example of which is shown in FIG. 7 to secure door 30 in the closed position. The locking mechanism 40 may include a first member 42 mounted to door 30, and a locking bracket 44 mounted to a side frame member 24 or 26, or other suitable location to inter-engage member 42 in a locking relationship. As shown in FIG. 4, an opening latch 46 may be provided on the exterior of door 30, for selective unlocking of mechanism 40. The latch mechanism 46 may itself be locked into a non-operable position for security, and unlocked by means of a key or like mechanism. As also shown in FIG. 4, door 30 may be provided with a strap member 48 to facilitate opening and closing of door 30. Suitable retractable door assemblies 16 for use in the invention may be similar to retractable doors as supplied by Whiting Door or Todco Companies, but having dimensions correlating to the door opening 14 and associated structures of the vehicle 10.

Typically, it will be desirable to provide the maximum opening for any particular vehicle 10 when converting to the use of a retractable door assembly according to the invention. As different manufacturers specifications may change, the dimensional characteristics of the frame 22 and retractable door assembly 16 may be modified to correlate to any particular vehicle as desired. Alternatively, a common frame and door combination may be used with any of the different originally manufactured vehicles available. Additionally, although the retractable door assembly 16 has been described as being manually operated by a user, a power roll up mechanism may be provided if desired to facilitate opening and closing of the door assembly 16.

It should also be recognized that although the embodiment of the invention has been described with reference to a retractable door assembly 16 for use with respect to a rear door opening 14 in vehicle 10, the panel van vehicles typically will have a side door opening 50 as shown in FIG. 2. Similar to the rear door opening 14, a side door opening 50 may also be configured to utilize a retractable door assembly in a similar manner. Further, it also should be evident that the vehicle conversion system according to the invention could be used with other modified vehicles 10, such as including a raised roof modification, wherein an existing roof of an originally manufactured vehicle is removed and a raised roof added to increase the height available on the interior of the vehicle. Alternatively, the vehicles of this type may also be converted to lower a portion of the floor region, such as similar to a handicap conversion, to increase the size of the access opening for particular applications. In these alternative embodiments, the retractable door assembly according to the invention would simply be modified to correspond to the dimensions of the door opening and vehicle characteristics accordingly.

Figure 5:
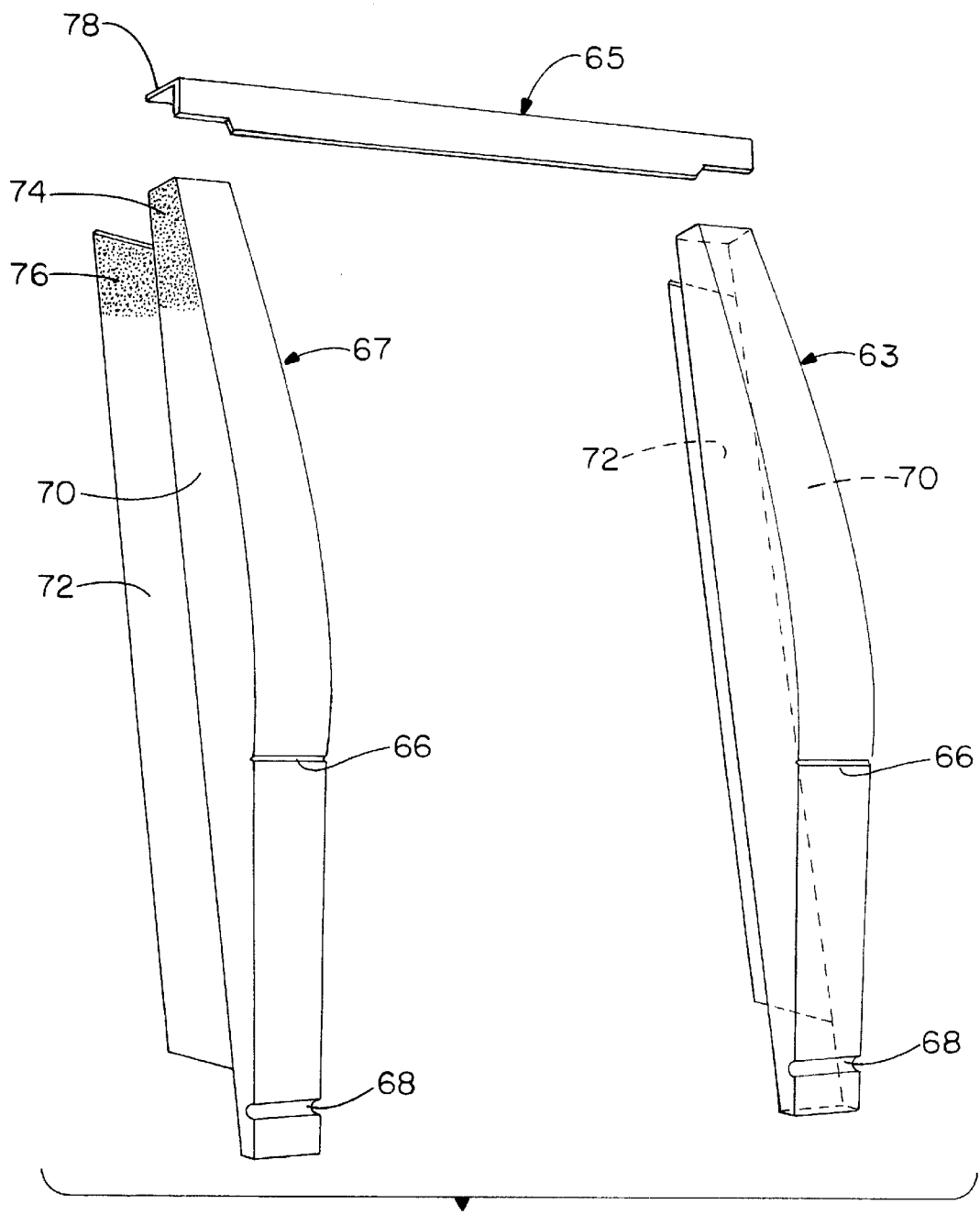
FIG. 5 is an assembly perspective view showing various transition panels, which may form a part of the inventive concept.

In a vehicle conversion system according to the invention as well as method of converting a vehicle, the standard doors of an originally manufactured vehicle 10 are removed, and the vehicle is retrofitted with a retractable door assembly 16 into cooperation with the door opening of the vehicle. As seen in FIG. 1, wherein the door 30 is shown in a retracted or storage position, it can be seen that some space may exist between the sides 18 and 20 of the door opening 14 and the frame members 24 and 26 associated with the conversion system. Alternatively, for some vehicles, the door assembly itself may be a "wrap-around" assembly including side quarter panels having light openings and possibly other structures built in to the assembly. Such a "wrap-around" assembly extends across the entire back side of the vehicle and wraps around the sides to some extent. In both situations, for aesthetic purposes, it is an aspect of the invention to provide at least one transition panel which fully encloses the space adjacent to the retractable door assembly 16, so as to give a finished appearance to the conversion system and vehicle, and to provide security for the cargo area. Turning to FIGS. 4 and 5, transition panels of this character are shown for an embodiment of the invention. In FIG. 4, an integral frame enclosing transition panel has first and second side portions 60 and 62, along with an integral top portion 64. In an embodiment of the invention, the transition panel including portions 60, 62, 64 replaces a "wrap-around" style rear door assembly. The transition panel [59] may comprise light fixture openings 61 or structures to receive vehicle lights in a manner, which emulates or simulates the originally manufactured rear door assembly of the vehicle. Thus, the rear door assembly can be fully replaced by the conversion door assembly of the invention. The transition panel may be secured in the desired position using mechanical fasteners, adhesives or other suitable fastening means to adjacent structures of the vehicle. Although the transition panel 59 may thus be secured into position by any suitable means, the embodiment as shown in the figures provides the panel 59 with flange areas which may be suitably adhesively secured to the vehicle at the edges of the door opening 14 as well as to the frame members associated with the conversion system. The transition panel 59 may be molded from a fiberglass or other suitable material to provide structural integrity as well as the desired aesthetic appearance thereof. Other materials or manufacturing methods are possible, such as metallic or composite materials, or the use of stamping or other methods. In the embodiment as shown, it is also noted that the transition panel 59 may be provided with contours and shapes which are intended to match the adjacent exterior surface of the vehicle 10 adjacent to the door opening 14 or other adjacent areas of the vehicle. Thus, the transition panels are contoured to match the vehicle, and may also include other appearance characteristics to match the vehicle as shown at 66 and 68. Similarly, the side and top portions 60, 62, and 64 may be contoured to match the sides and roofline of the vehicle as an example.

In an alternate embodiment as shown in FIG. 5, the transition panel may comprise a plurality of members, which are selectively utilized to enclose certain areas adjacent the retractable door assembly 14. In FIG. 5, there is shown a system of transition panels comprising side transition panels 67 and 63, and a top transition panel 65. Similarly to the transition panel 59 shown in FIG. 4, the transition panels 67, 63, 65 and 67 may comprise structures to allow coupling to adjacent vehicle structures. In the embodiment shown, the transition panel sections 67 and 63 have first and second flanges 70 and 72 which are shaped and configured to be adhesively secured in place relative to the vehicle and frame structure. Flange 70 may be provided with a suitable adhesive 74 on its exterior surface, to be secured to an edge portion of the door opening 14 of the vehicle 10, while flange 72 may be provided with an adhesive 76 on its interior surface so as to be secured to a side frame member 24 or 26 of the conversion system. Other suitable coupling means may again be used instead of an adhesive if desired. Similarly, top transition panel 65 may include a flange 78, which similarly may be provided with an adhesive on its exterior surface to be secured to a top edge of the door opening 14. Suitable adhesives are known and approved for automotive use, or other suitable structures or means to secure panels may be provided.

Figure 6:
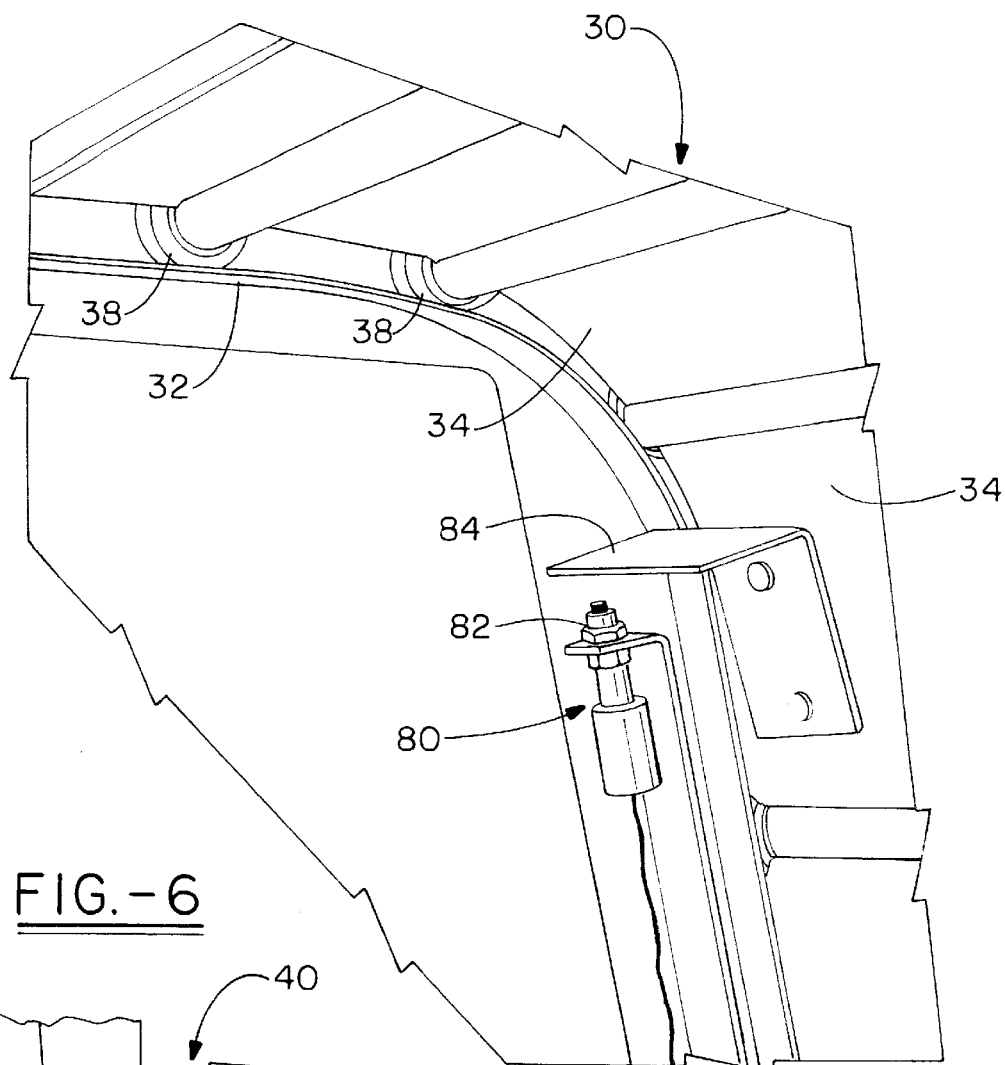
FIG. 6 is an interior perspective view showing a light switching system as may be associated with the invention.

Turning now to FIG. 6, there also may be provided in association with the retractable door assembly or conversion system according to the invention, an actuator system 80 for selective actuation of an interior light within the cargo area 12 of vehicle 10. As many of the originally manufactured panel vans include an interior light at a position directly above the door opening 14, it may be necessary to move the location of such a light, as the retractable door assembly would cover this typical location. An internal light may be situated at any appropriate place within the cargo area 12 outside of the storage position of the retractable door assembly 14 to illuminate this area, and the actuator system 80 is suitably located such that upon opening of the retractable door assembly 16, the light will be turned on. In the embodiment as shown in FIG. 6, an actuator switch 82 is engaged by an actuator bar 84 secured to the door 30. Upon closing of door 30, actuator bar 84 will engage switch 82 to turn the cargo area light off, and upon opening of door 30, will release and turn this light on.

Although the invention has been described with reference to a particular embodiment thereof, it should be recognized that a variety of modifications of alterations would occur to those of ordinary skill in the art, and such modification or alterations are contemplated and embodied by the invention. The invention is therefore not limited to the particular characteristics of the embodiment as shown, but only by the scope of the appended claims or their equivalents.

What is claimed is:

1. A panel vehicle comprising,
    an enclosed cargo area having at least one door opening for access thereto,
    a retractable door assembly provided in said at least one door opening, said retractable door assembly comprising a flexible door member slideable between open and closed positions within opposing track assemblies, wherein access to said cargo area is provided by selectively sliding said flexible door to said open position,
    the door assembly being mounted within a frame assembly mounted within the door opening in spaced relation to the door opening, and at least one transition panel mounted adjacent the frame assembly to substantially close the door opening adjacent the door assembly.

2. The panel vehicle of claim 1, wherein the vehicle is characterized by having a gross vehicle weight (GVW) of 10,000 pounds or less.

3. The panel vehicle of claim 1, wherein the vehicle is characterized by being converted using a ship through system, with an originally manufactured vehicle diverted for conversion at an independent facility to install the retractable door assembly and returning the vehicle for distribution via the vehicle manufacturer.

4. The panel vehicle of claim 1, wherein the tracks are mounted on the interior of the cargo area.

5. The panel vehicle of claim 1, wherein the retractable door assembly comprises a lock assembly for selectively locking the retractable door assembly in the closed position.

6. The panel vehicle of claim 1, wherein the at least one transition panel is configured to have a shape corresponding to portions of the vehicle adjacent the door opening.

7. The panel vehicle of claim 1, further comprising a plurality of transition panel members arranged to substantially close the door opening adjacent the door assembly.

8. The panel vehicle of claim 1, wherein the at least one transition panel is molded.

9. The panel vehicle of claim 1, wherein the at least one transition panel has trim features formed therein to substantially match trim features on adjacent portions of the vehicle on which it is mounted.

10. The panel vehicle of claim 1, wherein the at least one transition panel is adhesively fastened to portions of the vehicle to which it is mounted.

11. The panel vehicle of claim 1, wherein the at least one transition panel comprises at least one flange configured to mate with a portion of the vehicle which is adhesively fastened to the vehicle.

12. The panel vehicle of claim 1, wherein the at least one transition panel is mechanically fastened to portions of the vehicle to which it is mounted.

13. The panel vehicle of claim 1, wherein the retractable door assembly comprises an actuating system for an interior lighting system positioned within the cargo area such that the lighting system is illuminated upon moving the flexible door member to the open position.

14. A vehicle conversion kit system for a vehicle having an enclosed cargo area with at least one door opening, the kit comprising,
a frame assembly to be selectively secured within a door opening of the vehicle, a retractable door assembly to be selectively mounted in association with the frame assembly, and at least one panel member to substantially close said door opening adjacent the frame assembly.

15. The vehicle conversion kit system of claim 14, wherein the kit is provided to convert the vehicle using a ship through system, with an originally manufactured vehicle diverted for conversion at an independent facility to install the retractable door assembly and returning the vehicle for distribution via the vehicle manufacturer.

16. The vehicle conversion system of claim 14, wherein the retractable door assembly comprises a lock assembly for selectively locking the retractable door assembly in the closed position.

17. The vehicle conversion system of claim 14, wherein the at least one transition panel is configured to have a shape corresponding to portions of the vehicle adjacent the door opening on which it is mounted.

18. The vehicle conversion system of claim 14, further comprising a plurality of panel members arranged to substantially close the door opening adjacent the door assembly.

19. The vehicle conversion system of claim 14, wherein the at least one transition panel is molded.

20. The vehicle conversion system of claim 14, wherein the at least one transition panel has trim features formed therein to substantially match trim features on adjacent portions of the vehicle on which it is mounted.

21. The vehicle conversion system of claim 14, wherein the at least one transition panel is adhesively fastened to portions of the vehicle to which it is mounted.

22. The vehicle conversion system of claim 14, wherein the at least one transition panel comprises at least one flange configured to mate with a portion of the vehicle which is adhesively fastened to the vehicle.

23. The vehicle conversion system of claim 14, wherein the at least one transition panel is mechanically fastened to portions of the vehicle to which it is mounted.

24. The vehicle conversion system of claim 14, wherein the retractable door assembly comprises an actuating system for an interior lighting system positioned within the vehicle such that the lighting system is illuminated upon moving the flexible door member to the open position.

25. A method of converting a vehicle using a vehicle conversion kit comprising the steps of:
providing a vehicle having at least one door opening,
providing a conversion kit having a frame assembly, a retractable door assembly and at least one transition panel,
securing said frame assembly in association with said door opening, and
mounting a retractable door assembly to said frame assembly, wherein said retractable door assembly is selectively slideable between open and closed positions,
and mounting said at least one transition panel to substantially close said door opening.

26. The method of converting a vehicle according claim 25, wherein the vehicle is shipped to an independent facility and converted using a ship through system, with an originally manufactured vehicle diverted for installation of the retractable door assembly and returning the vehicle for distribution via the vehicle manufacturer.

27. The method of converting a vehicle according claim 25, wherein a lock assembly is provided in association with the door assembly for selectively locking the retractable door assembly in the closed position.

28. The method of converting a vehicle according claim 25, wherein the at least one transition panel is fabricated to have a shape corresponding to adjacent portions of the vehicle on which it is mounted.

29. The method of converting a vehicle according claim 25, wherein a plurality of transition panel members are mounted adjacent the door assembly to substantially close the door opening adjacent the door assembly.

30. The method of converting a vehicle according claim 25, wherein the at least one transition panel is molded.

31. The method of converting a vehicle according claim 25, wherein the at least one transition panel is fabricated to have trim features formed therein to substantially match trim features on adjacent portions of the vehicle on which it is to be mounted.

32. The method of converting a vehicle according claim 25 wherein the at least one transition panel is adhesively fastened to portions of the vehicle to which it is mounted.

33. The method of converting a vehicle according claim 25, wherein the at least one transition panel comprises at least one flange configured to mate with a portion of the vehicle which is adhesively fastened to the vehicle.

34. The method of converting a vehicle according claim 25, wherein the at least one transition panel is mechanically fastened to portions of the vehicle to which it is mounted.

35. The method of converting a vehicle according claim 25, wherein an actuating system is provided and coupled to an interior lighting system associated with the vehicle such that the lighting system is illuminated upon moving the flexible door member to the open position.

* * * * *